(12) United States Patent
Midgren et al.

(10) Patent No.: US 9,996,723 B2
(45) Date of Patent: Jun. 12, 2018

(54) METHODS OF STORING A SET OF BIOMETRIC DATA TEMPLATES AND OF MATCHING BIOMETRICS, BIOMETRIC MATCHING APPARATUS AND COMPUTER PROGRAM

(71) Applicant: PRECISE BIOMETRICS AB, Lund (SE)

(72) Inventors: Johannes Midgren, Södra Sandby (SE); Petter Österlund, Karlstad (SE)

(73) Assignee: Precise Biometrics AB, Lund (SE)

( * ) Notice: Subject to any disclaimer, the term of this patent is extended or adjusted under 35 U.S.C. 154(b) by 21 days.

(21) Appl. No.: 15/110,289

(22) PCT Filed: Dec. 9, 2014

(86) PCT No.: PCT/EP2014/077071
§ 371 (c)(1),
(2) Date: Jul. 7, 2016

(87) PCT Pub. No.: WO2015/104115
PCT Pub. Date: Jul. 16, 2015

(65) Prior Publication Data
US 2016/0328596 A1 Nov. 10, 2016

(30) Foreign Application Priority Data
Jan. 7, 2014 (SE) ..................................... 1450004

(51) Int. Cl.
*G06K 9/00* (2006.01)
*G06F 21/32* (2013.01)
*G06F 17/30* (2006.01)

(52) U.S. Cl.
CPC ... *G06K 9/00026* (2013.01); *G06F 17/30867* (2013.01); *G06F 21/32* (2013.01);
(Continued)

(58) Field of Classification Search
CPC .............. G06F 21/32; G06F 17/30867; G06K 9/00073; G06K 9/00093; G06K 9/00026; G06K 9/00067
(Continued)

(56) References Cited

U.S. PATENT DOCUMENTS 5,067,162 A * 11/1991 Driscoll, Jr. ....... G06K 9/00067
382/126
7,236,617 B1 6/2007 Yau et al.
(Continued)

FOREIGN PATENT DOCUMENTS

WO 02071314 A1 9/2002

*Primary Examiner* — Daniel Mariam
(74) *Attorney, Agent, or Firm* — Capitol City TechLaw

(57) ABSTRACT

There is provided a method of storing a set of biometric data templates, which emanates from a biometric object, among a plurality of biometric data templates, wherein each biometric data template comprises biometric data from only a part of a biometric object. The method comprises aligning biometric data templates with each other in view of the biometric object of the plurality of biometric data templates which comprises partially overlapping biometric data with at least one other biometric data template; determining the set of biometric data templates to be stored; and storing the set of biometric data templates. The determining of the set of biometric data templates to be stored comprises assigning a matrix of cells covering at least partially the aligned biometric data templates; determining, for each of the aligned biometric data templates, cells comprising distinguishable biometric data; and determining a combination of biometric data templates which comprises an amount of cells comprising distinguishable biometric data which fulfil a predetermined criterion. A method of biometric matching is also disclosed, and also a biometric matching apparatus and a computer program.

17 Claims, 9 Drawing Sheets

(52) U.S. Cl.
CPC ..... *G06K 9/00067* (2013.01); *G06K 9/00073* (2013.01); *G06K 9/00093* (2013.01)

(58) Field of Classification Search
USPC .............. 382/117, 118, 124, 209, 28, 2, 284
See application file for complete search history.

(56) References Cited

U.S. PATENT DOCUMENTS

| | | |
|---|---|---|
| 2003/0002718 A1 | 1/2003 | Hamid |
| 2005/0175225 A1* | 8/2005 | Shinzaki .............. G06K 9/0008 382/124 |
| 2011/0044514 A1 | 2/2011 | Rahmes et al. |
| 2011/0249872 A1 | 10/2011 | Monro |
| 2011/0262013 A1 | 10/2011 | Rahmes et al. |

\* cited by examiner

METHODS OF STORING A SET OF
BIOMETRIC DATA TEMPLATES AND OF
MATCHING BIOMETRICS, BIOMETRIC
MATCHING APPARATUS AND COMPUTER
PROGRAM

This application claims priority under 35 USC 119(a)-(d) to SE patent application No. 1450004-5, which was filed on Jan. 7, 2014, the entire content of which is incorporated herein by reference.

TECHNICAL FIELD

The present invention generally relates to a method of storing a set of biometric data templates, a method of matching biometrics, a biometric matching apparatus, and a computer program for implementing the methods.

BACKGROUND

Use of small biometric sensors, i.e. sensors that do not collect biometric data about the whole biometric object, may be desired due to constraints caused by e.g. physical design of an apparatus used to collect the biometric data. Use of such small biometric sensors may also cause a problem where earlier collected biometric data for a biometric template and collected biometric data for matching to the template do not overlap enough for a proper matching. An approach to alleviate this is to use multiple biometric readings for the template wherein likelihood for overlap increases. An approach is to store a large amount of templates. However, this approach not only requires large memory space, but also increases complexity in choosing the template to match with. It is therefore a desire to handle such multiple templates efficiently.

SUMMARY

An object of the invention is to at least alleviate the above stated problem. The present invention is based on the understanding that a limited set of templates may be selected based on the information content of the respective templates. The inventors have found an approach of assigning a matrix of cells for determining contributed information content from respective candidates for templates to be stored, from which a limited set of templates may be determined to be stored.

According to a first aspect, there is provided a method of storing a set of biometric data templates, which emanates from a biometric object, among a plurality of biometric data templates, wherein each biometric data template comprises biometric data from only a part of a biometric object. The method comprises aligning biometric data templates with each other in view of the biometric object of the plurality of biometric data templates which comprises partially overlapping biometric data with at least one other biometric data template; determining the set of biometric data templates to be stored; and storing the set of biometric data templates. The determining of the set of biometric data templates to be stored comprises assigning a matrix of cells covering at least partially the aligned biometric data templates; determining, for each of the aligned biometric data templates, cells comprising distinguishable biometric data; and determining a combination of biometric data templates which comprises an amount of cells comprising distinguishable biometric data which fulfil a predetermined criterion.

The criterion may be which combination of the biometric data templates which comprises the most cells comprising distinguishable biometric data.

The criterion may be that the amount of cells exceeds a predetermined threshold.

The set of biometric data templates may be limited to a predetermined number of biometric data templates.

The amount of cells may be weighted by a quality parameter for each cell. The quality parameter may comprise at least one of an amount of distinguishable biometric data in each cell; a quality or confidence parameter of respective distinguishable biometric data in each cell; and a location in the matrix of cells.

The storing of the set of templates may include storing alignment data acquired in the aligning of the biometric data templates with each other.

The assigning of the matrix of cells may comprise placing a centre of the matrix in a geometric centre of the aligned biometric data templates.

The size of the matrix may be determined such that all data of aligned biometric data templates is within the matrix.

The size of the matrix may be predetermined.

Each cell may correspond to a size such that the biometric object is considered covered by 5 to 50 cells by 5 to 50 cells.

According to a second aspect, there is provided a method of matching biometrics to determine if a biometric reading and set of biometric data templates emanates from biometric objects which are idem. The method comprises storing a set of biometric data templates according to the first aspect; reading a biometric object to be checked; extracting biometric data from the biometric reading; and matching the extracted biometric data with biometric data of one or more of the templates of the set of biometric data templates.

The method may, upon a found match, further comprise updating the set of biometric data templates by assigning the set of biometric data templates and the biometric data from the biometric reading as the plurality of biometric data templates and storing an updated set of biometric data templates by performing the method according to the first aspect.

According to a third aspect, there is provided a biometric matching apparatus comprising a receiver for receiving biometric data of a biometric reading; a memory access circuit arranged to access a memory capable of holding a set of biometric data templates; and a processing device connected to the receiver and the memory access circuit. The processing device is arranged to perform at least one of: determine whether received biometric data match at least one of the templates of the set of biometric data templates according to the second aspect; and store a set or updated set of the set of biometric data templates according to the first or second aspect.

The apparatus may be a portable data carrier.

The apparatus may be a wired or wireless communication device.

According to a fourth aspect, there is provided a computer program comprising computer executable instructions, which instructions cause a computer to, when downloaded to and executed on a processor of the computer, perform the method according to any of the first and second aspects.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Biometrics is used for recognising and/or authenticating individuals from physiological characteristics. A certain biometric object, such as fingerprint, face, iris, vein pattern, hand, foot, retina, etc. is normally chosen for a biometric comparison, i.e. biometric matching, although combined systems may be applied, i.e. where two or more biometric objects are used for the matching. It is here to be noted that matching is performed by processing means such as signal processing, digital processing, etc., wherein biometric data from the biometric object is considered. Thus, within the processing means, only data representing the biometric object is present, wherein the way of representing the biometric object is important. Furthermore, the term "template" is used within the field of biometric matching, which refers to an enrolled representation of a biometric object which may be stored for a later comparison with a biometric "sample" to determine if the sample emanates from the same biometric object as the template, i.e. matching. Within biometrics, it is often referred to the term "features". Features are also often divided into level one features, such as quality or orientation field features of the biometric object, level two features, such as minutiae or other features describing sub-objects of the biometric object, and level three features, such as pores or other highly detailed elements of the biometric object. One or more levels of features may be used for biometric matching.

Figure 1:
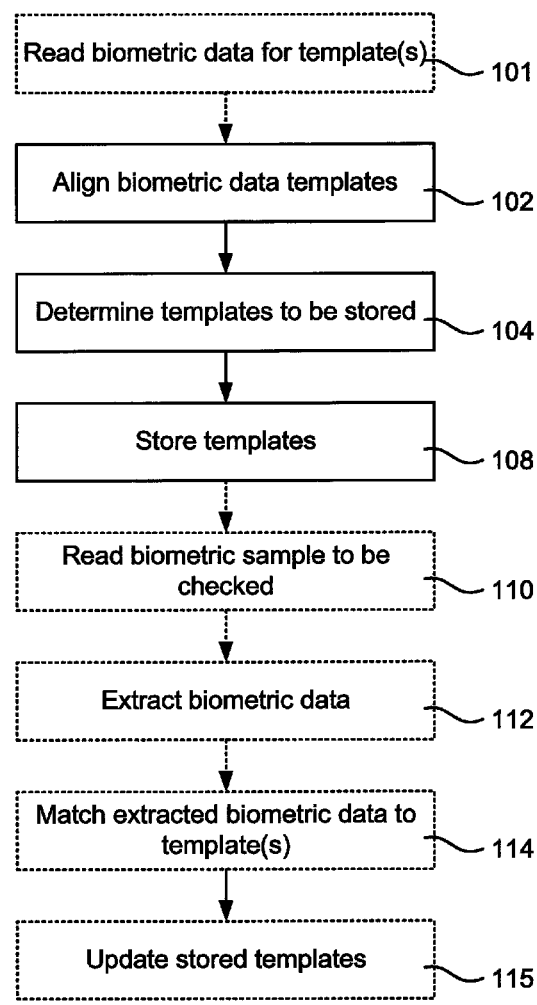
FIG. 1 is a flow chart schematically illustrating a method of storing a set of biometric data templates according to an embodiment.

FIG. 1 is a flow chart illustrating a method of storing a set of biometric data templates, and also, optionally as indicated by hashed lines, a method of biometric matching to determine if a biometric reading and the set of stored biometric data templates emanates from biometric objects which are idem. Further optionally, FIG. 1 illustrates updating of the templates. FIG. 1 shows a fingerprint as example of a biometric object, but other biometric objects, such as iris, vein patterns, face, etc. are equally applicable. Furthermore, the shown example is a two-dimensional representation, but three-dimensional representations are equally feasible, such as for example for vein patterns, and the principles demonstrated below apply also for the three-dimensional case, where a further dimension also may be added to the matrices explained below. Other multi-dimensional cases may also apply, where further dimensions may be added to the matrices. A further dimension may include non-spatial dimensions for features that are not spatially tied, such as time, frequency, etc. instead of or in addition to spatial data, which may be applicable for some biometric data. The time or frequency dimension may for example be considered for covering a time or frequency window and timing or tuning of the biometric data similar, when considering the data, to what is demonstrated for the two-dimensional spatial data below. Other natural features may be assigned a non-spatial dimension in the matrix in a similar way. Still further, the depicted biometric object is shown with an image suitable for extraction of level two features and using those for the matching, but the principles demonstrated below are equally feasible for other levels of features, or a combination of levels of features.

The method is based on the assumed limitations, due to desired size, power consumption, available memory and/or processing power, etc. of used equipment, that each biometric template, and likely also a read biometric object, comprises data from only a part of a biometric object. That is, a representation of the entire biometric object is not used to form a biometric data template or a biometric data sample to compare with the template. This implies that a biometric data template and a biometric data sample may not cover the same information about the biometric object. This issue may be dealt with by using a plurality of templates of the one biometric object, wherein probability that the coverage of the same information about the biometric object may increase. In line with the assumed limitations, it is possible that only a limited number of templates are possible or desired to be stored, which may be caused by constraints in hardware or performance considerations, i.e. for the storing and/or the processing of matching with the different stored templates. However, the set of templates is still desired to cover as much as possible of relevant parts of the entire biometric object, or at least enough, to make it likely that a proper matching can be done on a received biometric reading, i.e. without annoying a user by asking for another reading due to scarce overlap between the biometric reading and any of the stored templates. The method is further based on the approach for better aggregate coverage of the stored templates by wisely selecting the templates to store, i.e. enable the storing of a plurality of templates, but still emanating from one and the same biometric object. It is thus assumed that a plurality of biometric data templates is available, wherein the plurality is greater than the number of desired or possible templates to store, i.e. a selection is necessary. The plurality of biometric data templates may be acquired by a reading 101 of biometric objects, but may be acquired in other ways to, such as being received from another entity or context.

The plurality of biometric data templates are aligned 102 with each other in view of the biometric object they represent. This is for example feasible if each biometric data template has at least some overlap with at least another of the biometric data templates. Templates may be given an indication, e.g. a tag, whether it was feasible to align. From the aligned biometric data templates and their data, the set of biometric data templates to be stored is determined 104, as will be demonstrated with reference to FIG. 2, and then the set of biometric data templates that has been determined is stored 108. In case a template is not feasible to align, but the template seems desirable to store, e.g. based on some quality indicator, and the limit for storable templates is not reached, the non-aligned template may be stored anyway, wherein it is possible that the non-aligned template may be aligned later on in a template update procedure, which will be described further below. Such a stored but non-aligned template is preferably not used at matching, wherein the alignment indicator may be used for excluding the template from the matching, i.e. although it is stored.

Upon performing matching with the stored set of templates, a biometric object to be checked is read 110, data corresponding to the data of the templates is extracted 112, and the extracted data is matched to one or more of the stored templates. The result of the match is processed depending on application, and is not part of the contribution of this disclosure, wherein that is not further elucidated.

Figure 3:
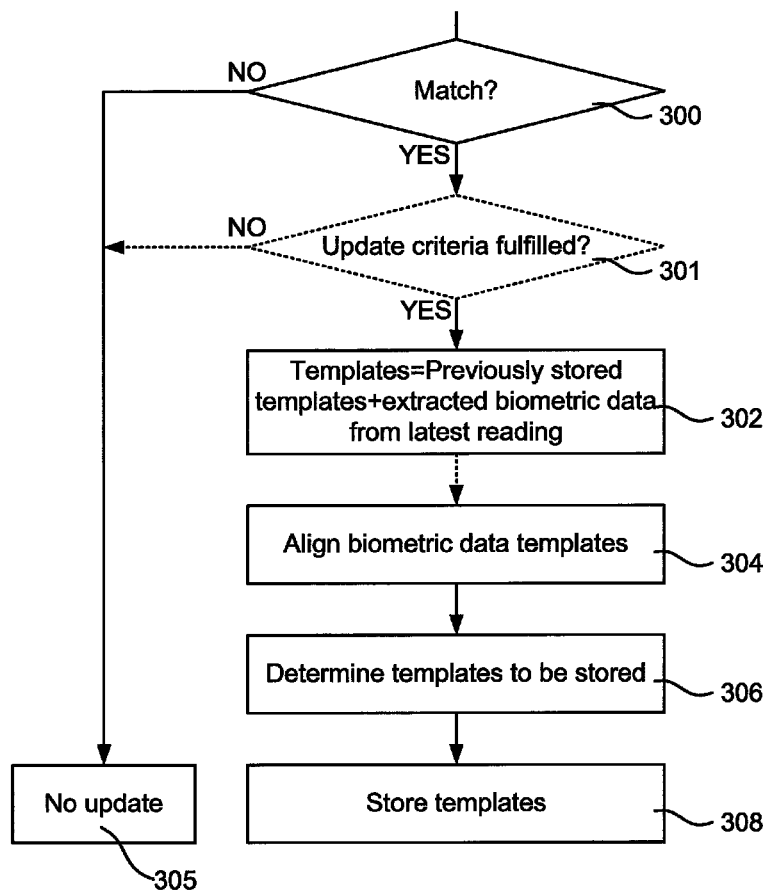
FIG. 3 is a flow chart schematically illustrating an update procedure according to an embodiment.

Optionally, the stored templates are updated upon match, which will be further demonstrated with reference to FIG. 3.

Figure 2:
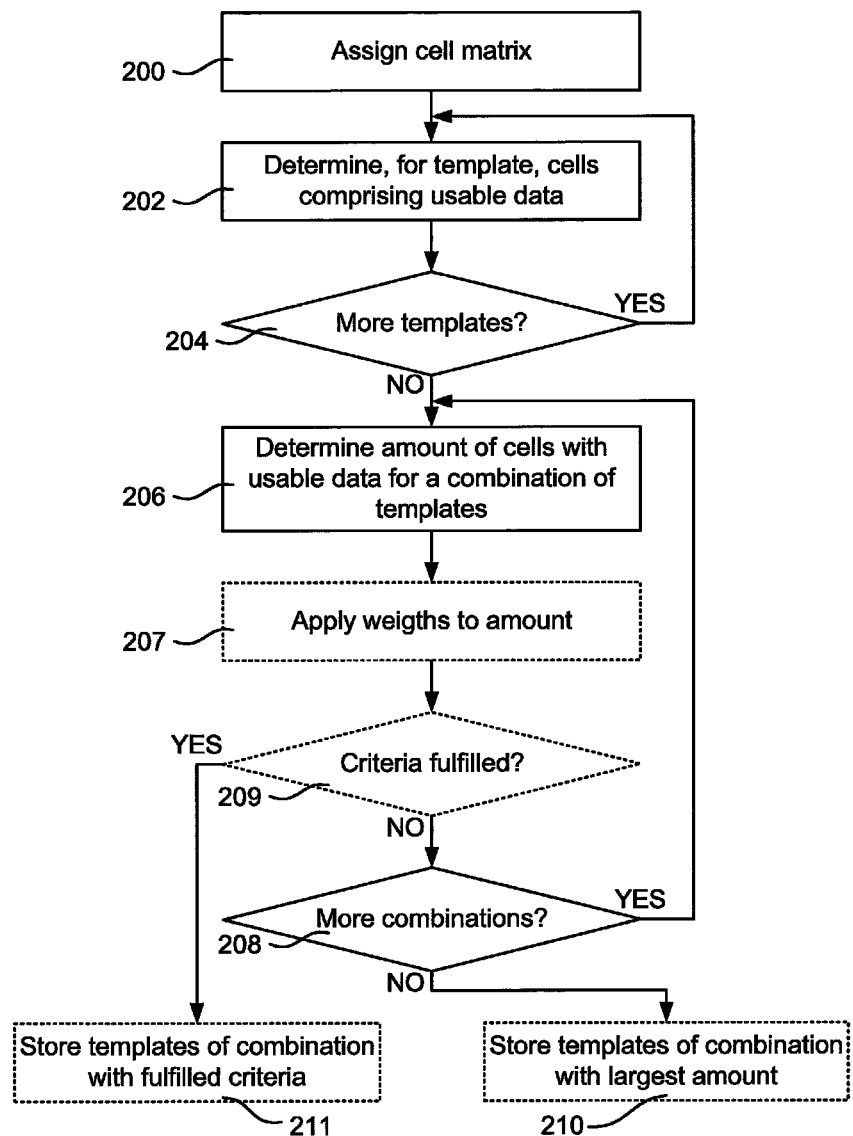
FIG. 2 is a flow chart schematically illustrating determination of the set of biometric data templates to be stored according to an embodiment.

FIG. 2 is a flow chart schematically illustrating determination of the set of biometric data templates to be stored according to an embodiment. It is assumed that biometric data templates are acquired as has been demonstrated with reference to FIG. 1, and the task is to determine which to store. A matrix is assigned 200. The matrix comprises cells covering at least partially the aligned biometric data templates. In case of a three-dimensional biometric data template, the cells are also three-dimensional. The size of the matrix can be chosen based on different design considerations, such as performance and constraints. According to one embodiment, the size of the matrix is determined such that all data of aligned biometric data templates is within the matrix. This provides that all data will be considered in the selection procedure demonstrated below. According to one embodiment, the size of the matrix is predetermined. This may be for example due to constraints in what size of matrix that is considered possible, feasible or efficient to handle in the selection procedure demonstrated below, e.g. based on used hardware or platform for the processing. In the latter case, it may not be sure that all data will be considered, i.e. if being outside the predetermined size of the matrix, but the effort of handling of the matrix, i.e. in sense of memory and processing power, will be predictable.

The cells may be of a size where the biometric object is considered covered by 5 to 50 cells, considered along one dimension of the matrix. This will provide an expected amount of data in respective cells that is enough for the determination, but still providing enough granularity for proper selection. Consider for example biometric object being a fingerprint. A fingerprint is reasonably maximum three by three centimeters. Consider the fingerprint being read to provide a 500 dpi image. For a cell to comprise some fingerprint data to consider, it is reasonably at least 0.8 mm in square, which with the resolution corresponds to 16 pixels in square, i.e. 256 pixels in a cell, to provide e.g. ridge information. Considering the amount of information in a fingerprint and the intended use of a small template covering only a part of the entire fingerprint, the cells are preferably chosen not to exceed 3.2 mm in square, i.e. 64 pixels in square in this example. This corresponds to about 9 to 38 cells in square for the entire fingerprint considering the maximum reasonable size considered above. Corresponding considerations may be made for other biometric objects when determining the suitable cell size.

For each 204 of the aligned biometric data templates, cells comprising distinguishable biometric data are determined 202. We now may have some kind of map of usable data. From this, a combination of biometric data templates which comprises an amount of cells comprising distinguishable biometric data which fulfil a predetermined criterion is determined 204. This may be performed by checking each 208 combination and storing 210 the combination with the largest amount, or by finding 209 a combination with sufficient amount and storing 211 that combination. The cells may be given more or less importance depending on their position in the matrix, wherein the amounts may be weighted 207 accordingly before the determination 208, 209 of the combination to store.

Returning to the assignment 200 of the matrix, the matrix may for example be centred based on aligned templates to catch as much potentially usable information as possible for the determination of combination. Different approaches may be applied for this. For example, the matrix may be centred with an average centre position of aligned templates. The matrix may be centred with a chosen template, which for example may be chosen on a quality metric, e.g. with the assumption that highest quality is most probable for a reading in a centre of a biometric object. A similar approach, but with an average position for a subset of the templates with high quality metrics may also be applied.

With reference to the discussion above regarding features on different levels, the estimated amount of usable data in the cells may be based on level two features, e.g. extracted minutiae. However, the estimated amount may be based on level one features, which may be beneficial since no or at least less extraction is needed. Similarly, level three features may be used for estimating the amount, or a combination of the features of the different levels.

The estimated amount for a cell may be made based on one or more templates. One approach is to only count the amount from the template making the most contribution. Alternatively, the estimation may include an aggregate contribution from the templates, which furthermore may be weighted or other estimated by a function therefrom.

FIG. 3 is a flow chart schematically illustrating an update procedure according to an embodiment. Upon a considered match 300, it is optionally checked 301 whether update criteria for the recently read biometric data are fulfilled, which may be performed for example by the similar approaches as for judging a reading demonstrated with reference to FIG. 2. If so, or if it is determined already from the match 300, the set of templates is updated 302 with the recently read biometric data, wherein the set of templates are aligned 304 and the templates to be stored are determined 306. This is also performed similar to what has been demonstrated with reference to FIG. 2, and the selected templates are then stored 308 as the new set of templates. If no match 300 is present, or update criteria are not fulfilled 301, it is determined 305 that no update of the set of templates will occur. The overall procedure preferably returns to normal operation, i.e. to check biometric input when occurring.

Figure 4:
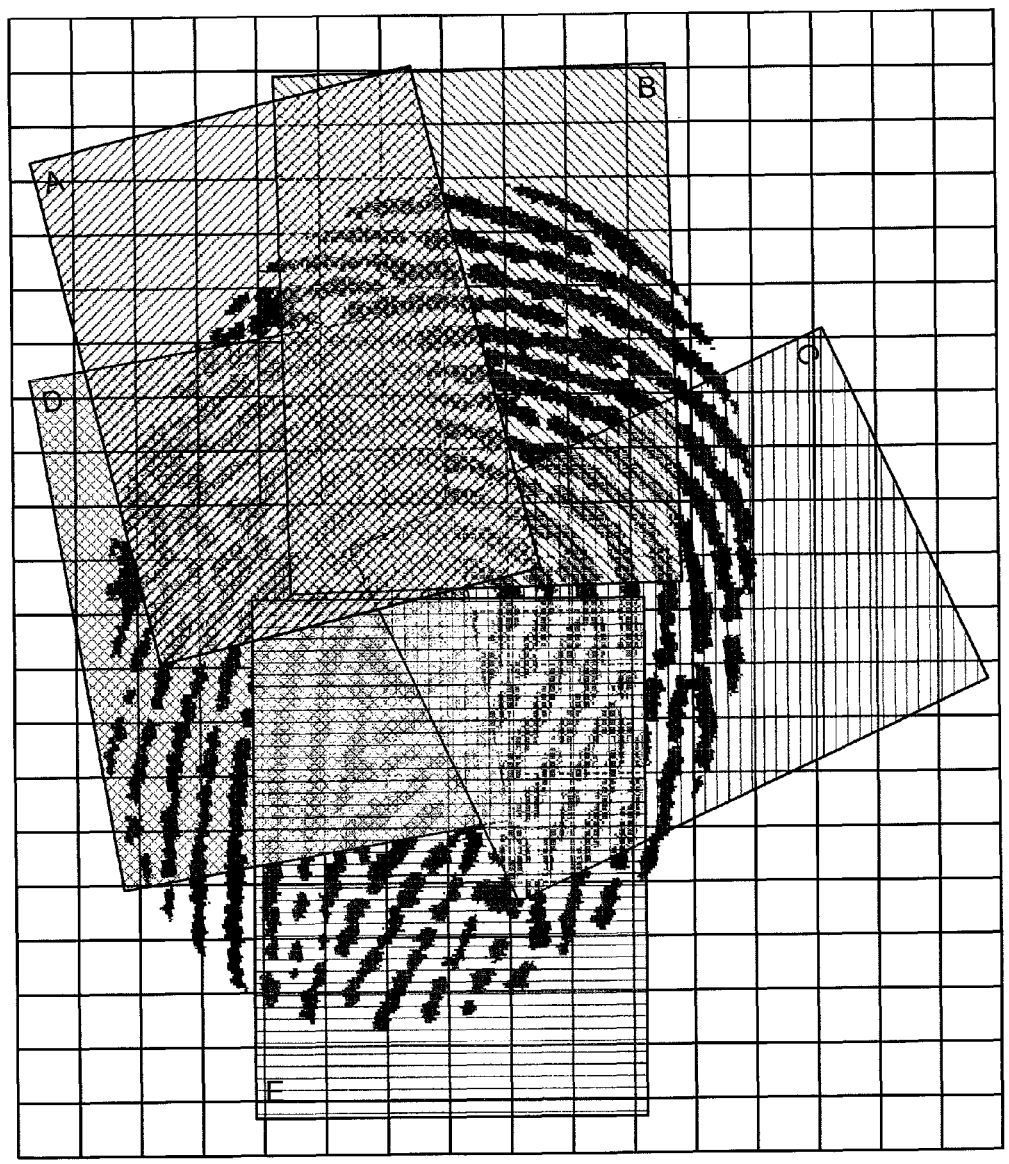
FIG. 4 schematically illustrates a plurality of templates and an assigned cell matrix according to an embodiment.

FIG. 4 schematically illustrates a plurality of templates and an assigned cell matrix according to an embodiment. In FIG. 4, the assigned cell matrix is chosen such that all templates under consideration are covered by the cells of the matrix. This may be performed by determining, after alignment, max and min positions for respective dimension of the matrix, and assigning the cells of the cell matrix accordingly. Update of the cell assignment may be performed, e.g. upon update of the set of templates or based on other triggers. This may for example be that an average position of templates and/or template candidates has changed more than a threshold value, update of the set of templates has occurred more than a threshold number of times, etc. An advantage of not updating the cell matrix too often is that recalculation for all templates need not be done frequently. An advantage of updating the cell matrix on the other hand is that selection of accurate templates may improve.

In FIG. 4, five potential templates A-E are indicated. For example templates B and E cannot be mutually aligned by themselves since they do not have any overlap. Similarly, templates A and C may not be mutually aligned by themselves since they may not have sufficient overlap and/or the difference in angle may be too big. However, all of the templates A-E may still be aligned with aid of each other. For example may templates B and E be aligned by their respective alignment with template D, and templates A and C may be aligned by their respective alignment with template B. Alternatively, template C may not be able to align to the other templates due to the deviation in angle, wherein the biometric data related to template C simply is erased, i.e. without any calculations based on cell contribution.

Consider for example that only three templates are to be stored. The selection is thus made according to the principles demonstrated with reference to FIG. 2. The three templates, sole or in combination, providing cells with the most contribution of usable features are determined, and will be stored as a template set. For example, templates B, D and E, as illustrated in FIG. 5, may be chosen and stored.

Figure 5:
FIG. 5 illustrates the scenario of FIG. 4 but with selected templates for storing.

FIG. 5 illustrates the scenario of FIG. 4 but with selected templates for storing. In FIG. 5, another example of assignment of the cell matrix is indicated, where the cell matrix is generously assigned such that more or less any biometric reading will fit within the cells of the matrix. An advantage of this is that the assignment of cells may be kept constant, and no update of cell assignment needs to be done.

Figure 6:
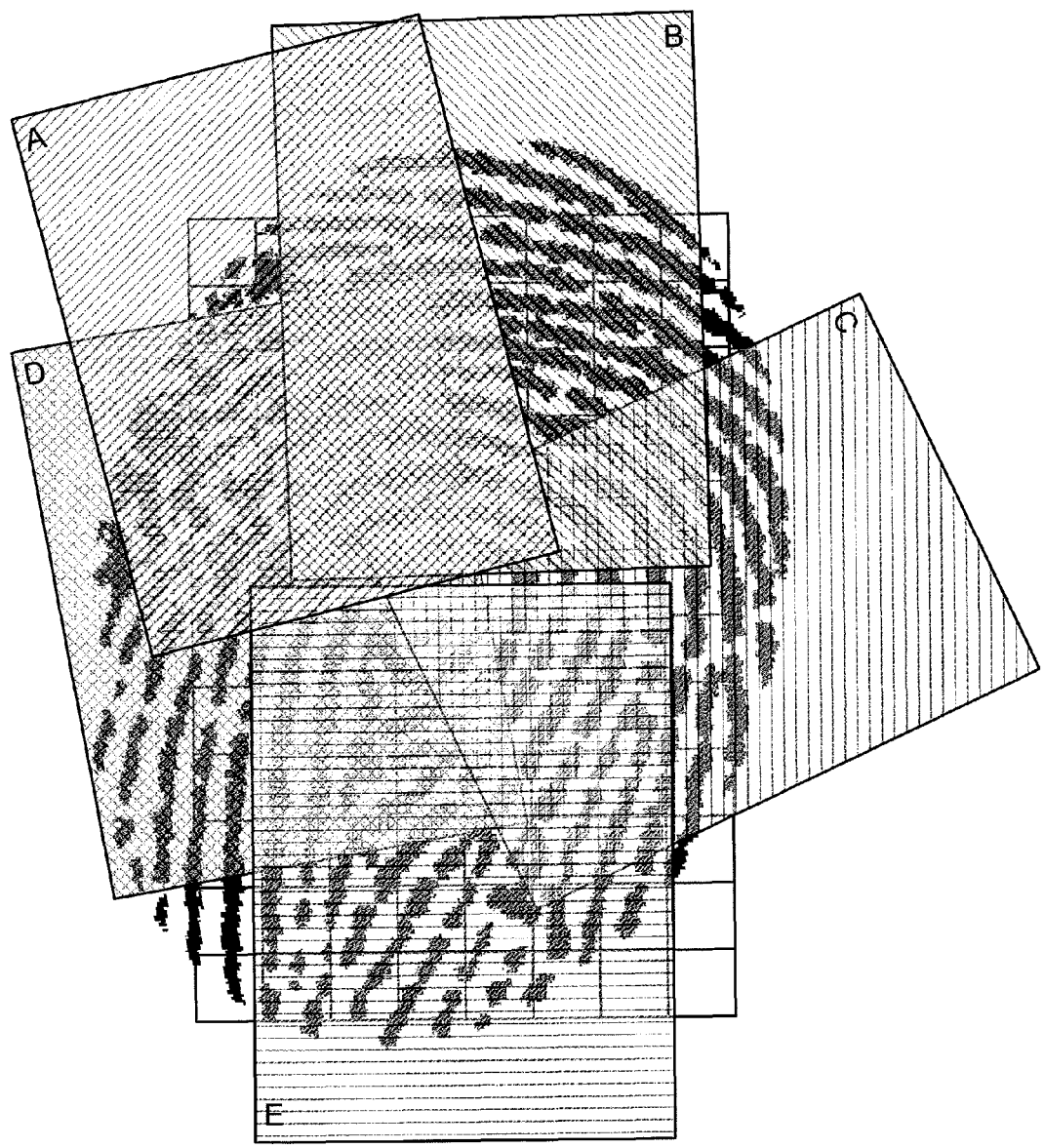
FIG. 6 schematically illustrates a plurality of templates and an assigned cell matrix according to an embodiment.

FIG. 6 schematically illustrates a plurality of templates and an assigned cell matrix according to an embodiment. It may be desired to limit the amount of cells, since many cells may provide too many calculations compared with what is feasible for the available processing power and/or processing time. The size of the cell matrix may thus be chosen based on such criteria, while the positioning of the cell matrix may be chosen for example centred in view of a likely position, i.e. similar to what is made for the generously sized cell matrix demonstrated with reference to FIG. 5, or based on actual biometric data for stored and/or read templates to be considered. Since the benefit of the cell matrix may depend much on proper position due to the limited amount of cells, further parameters may be used for the positioning, e.g. quality data for templates and/or template candidates used for the positioning of the cell matrix. A fair trade-off between complexity and efficient positioning may be to select position based on average position of templates and/or template candidates.

In FIG. 6, the similar example of candidate templates A-E as illustrated in FIG. 4 is shown, but in the context of the smaller cell matrix. In a similar way, a subset of the templates may be selected for storing.

Figure 7:
FIG. 7 illustrates the scenario of FIG. 6 but with selected templates for storing.

FIG. 7 illustrates the scenario of FIG. 6 but with selected templates for storing. Here, the three templates B, C and D are indicated as the selected.

Figure 8:
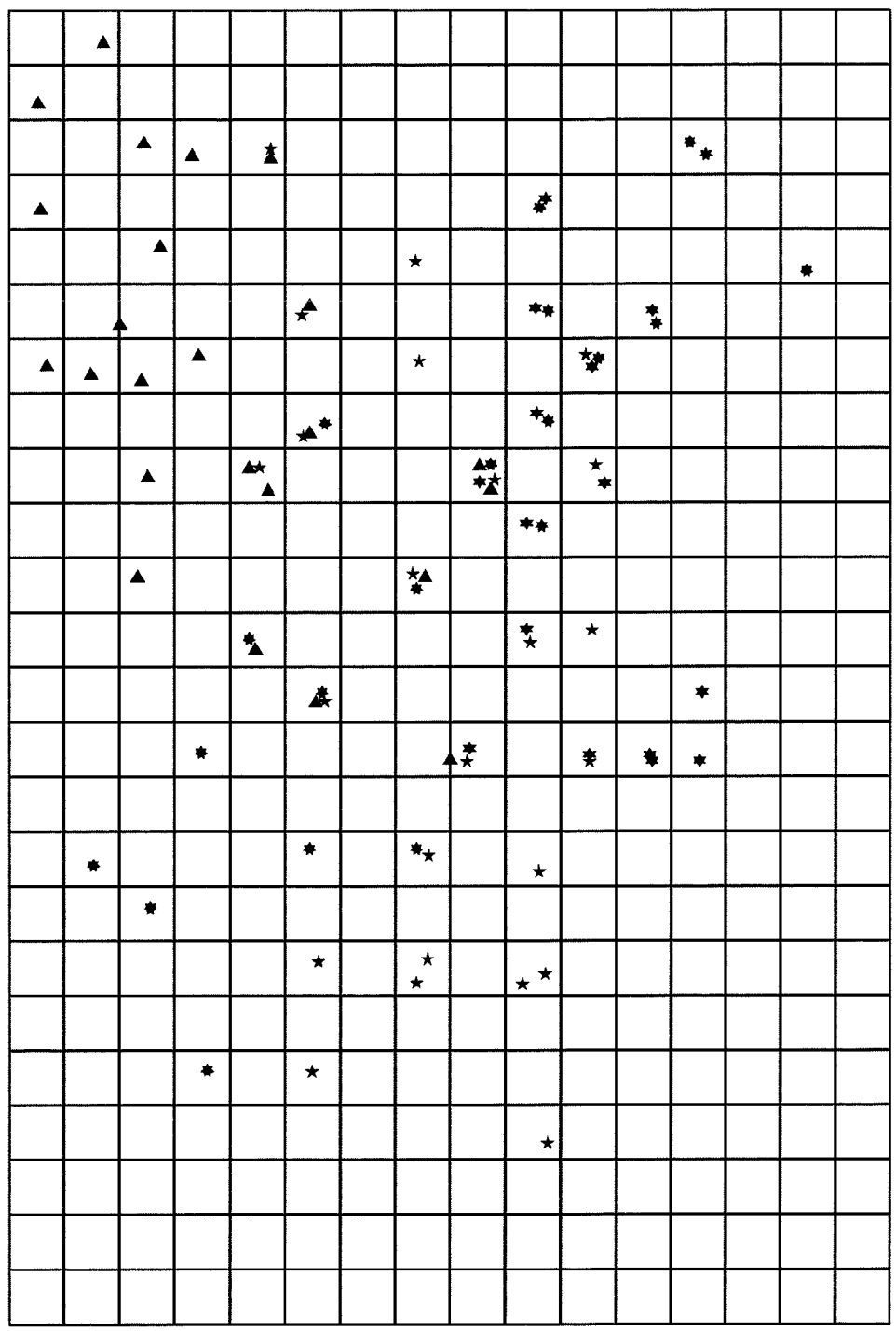
FIG. 8 illustrates population of usable data from different templates in cells of a matrix according to an embodiment.

FIG. 8 illustrates population of usable data from different templates in cells of a matrix according to an embodiment. The respective symbol indicates that a feature emanates from a respective biometric reading, i.e. a template or candidate template. The features may be from different levels, as discussed above, depending on a selected approach for determining candidate templates for storing. Instead of a symbol, a corresponding quality indication from respective template and/or candidate template may be an equally feasible approach. In such case, the lack of a symbol may be considered as a zero quality indication. The calculation of most promising templates or set of templates may thus be made according to the approaches demonstrated above.

A simple approach is to determine the amount of cells that contain a feature for the respective template candidate. For example, the template candidate which contributes with features indicated by triangles has features in 22 cells, which then may be used for a figure in determining whether the triangle candidate should be stored as a template. Another approach is to weight the counting by quality data and/or amount of features in respective cell. Additionally or alternatively, to achieve spatial coverage of stored set of templates, position of contributing cells may be considered, e.g. by weighting. Here, cells in centre of the matrix may for example be weighted higher than cells at the border of the matrix. Still further, a cell comprising features from more than one candidate may be considered according to different approaches. The cell may for example be counted only for the template candidate having the highest quality figure for the feature, which may improve the overall quality of the set of stored templates.

Figure 9:
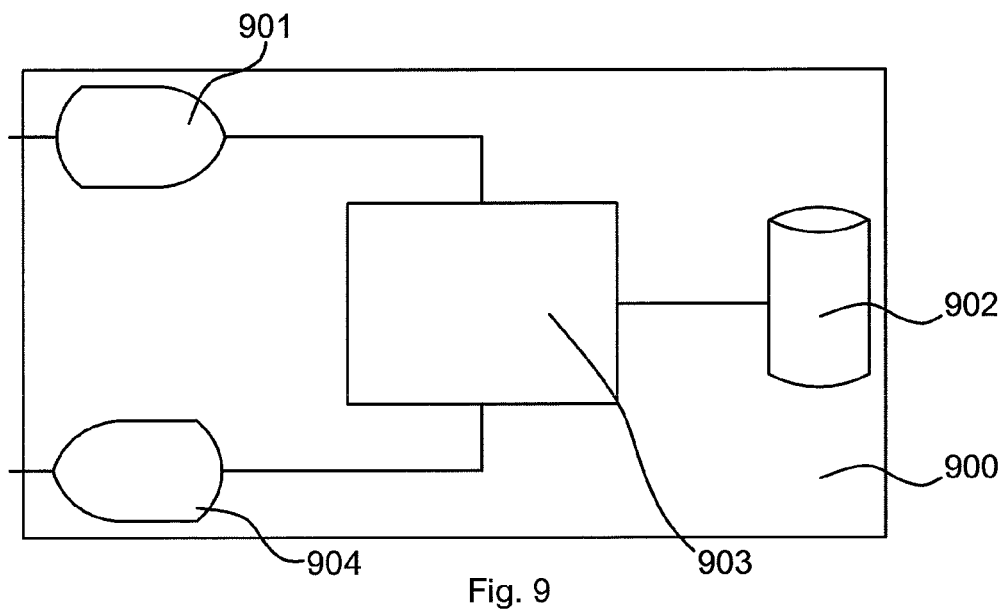
FIG. 9 is a block diagram schematically illustrating an apparatus according to an embodiment.

FIG. 9 schematically illustrates a biometric matching apparatus 900 comprising a receiver 901 for receiving a first set of biometric data, e.g. minutia points, of a biometric reading, a memory access circuit 902 arranged to access a memory capable of holding a set of biometric templates, and a processing device 903 connected to the receiver 901 and the memory access circuit 902, and arranged to perform any of the methods above. The memory may be included in the biometric matching apparatus 900 or be a remote memory, e.g. a remote database, a memory card, smartcard, etc. The processing device is further arranged to, when performing matching between the received biometric data and one or more of the templates of the stored set of templates, providing an output, depending on the result, via a transmitter 904.

The receiver 901 should be broadly construed to be a functional element arranged to collect biometric data, e.g. a set of minutia points representing a fingerprint. The collecting may comprise reading a fingerprint image from a sensor and extracting the minutia point set from the acquired image, and in such case the receiver 901 comprises a fingerprint sensor and an extraction circuit. The biometric sample, e.g. a fingerprint image, iris image, vein pattern, face image, etc., can be presented from another entity or context, where the collecting comprises receiving or accessing the biometric sample and extracting features therefrom, e.g. accessing the fingerprint image and extracting the minutia point set from it, and in such case the receiver 901 comprises a communication circuit, for wired or wireless communication, for receiving the biometric sample data, and an extractor circuit. Further, the biometric data set can be presented from another entity or context, where the collecting comprises receiving or accessing the biometric data set, and in such case the receiver 901 comprises a communication circuit, for wired or wireless communication, for receiving the biometric data.

The memory access circuit 902 which is arranged to access a memory holding at least a set of biometric data templates may be comprised in the processing device 903 or in a memory, and should be functionally construed. The memory can be a server, a volatile memory temporarily storing the one or more templates during the matching, a non-volatile memory, e.g. on a data carrier, forming a part of an identification item, or other data holding equipment suitable for the implementation in question. In certain cases, the memory may be a part of the processing device 903, which can be particularly suitable when template is to be kept secret, and the processing device 903 is enabled to store the template in a secure memory area e.g. on its chip. This will make it more or less impossible to tamper or steal the data.

The transmitter 904 should also be functionally construed, and may be a part of the processing device 903, where for example a secret, such as an access, authentication or decryption key, is "transmitted" internally in the processing device or its peripheral devices to enable a certain function upon match.

The processing device 903 can be, depending on the implementation and its purpose, anything from an embedded processor of a smart card to a corporate, nation or world wide data network, e.g. for financial, intelligence, infrastructural, or other purposes gaining benefit from matching or identification of biometrics, and there between personal computing or portable communication devices gaining benefit by e.g. replacing passwords and identification numbers with convenient biometric solutions.

The biometric matching apparatus 900 is arranged, by its functional elements 901-904, to implement the functions demonstrated above with reference to FIGS. 1 to 8.

Figure 10:
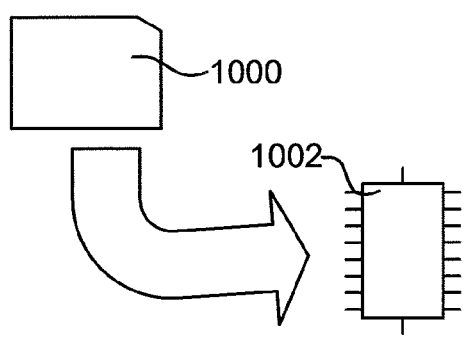
FIG. 10 illustrates a non-transitory computer-readable medium and a processing means.

The methods according to the present invention are suitable for implementation with aid of processing means, such as computers and/or processors, especially for the case where biometric handling is performed by a digital processor. Therefore, there is provided computer programs, comprising instructions arranged to cause the processing means, processor, or computer to perform the steps of any of the methods according to any of the embodiments described with reference to FIGS. 1 to 8. The computer programs preferably comprises program code which is stored on a computer readable medium 1000, as illustrated in FIG. 10, which can be loaded and executed by a processing means, processor, or computer 1002 to cause it to perform the methods, respectively, according to embodiments of the present invention, preferably as any of the embodiments described with reference to FIGS. 1 to 8. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of storing a set of biometric data templates, which emanates from a biometric object, from among a plurality of biometric data templates, wherein each biometric data template includes biometric data from only a part of the biometric object, the method comprising:
   aligning a plurality of biometric data templates with each other in view of the biometric object of the plurality of biometric data templates, which involves partially overlapping at least one biometric data template of the plurality of biometric data templates with at least one other biometric data template of the plurality of biometric data templates;
   determining the set of biometric data templates to be stored; and
   storing the set of biometric data templates;
   wherein the determining of the set of biometric data templates to be stored involves
      assigning a matrix of cells covering at least partially the aligned biometric data templates;
      determining, for each of the aligned biometric data templates, cells comprising distinguishable biometric data; and
      determining a combination of biometric data templates which includes an amount of cells comprising distinguishable biometric data which fulfil a predetermined criterion.

2. The method of claim 1, wherein the criterion is which combination of the biometric data templates that includes the most cells having distinguishable biometric data.

3. The method of claim 1, wherein the criterion is that the amount of cells exceeds a predetermined threshold.

4. The method of claim 1, wherein the set of biometric data templates is limited to a predetermined number of biometric data templates.

5. The method of claim 1, wherein the amount of cells is weighted by a quality parameter for each cell.

6. The method of claim 5, wherein the quality parameter comprises at least one of
   an amount of distinguishable biometric data in each cell;
   a quality or confidence parameter of respective distinguishable biometric data in each cell; and
   a location in the matrix of cells.

7. The method of claim 1, wherein the storing of the set of biometric data templates includes storing alignment data acquired in the aligning of the biometric data templates with each other.

8. The method of claim 1, wherein the assigning of the matrix of cells comprises placing a center of the matrix in a geometric center of the aligned biometric data templates.

9. The method of claim 1, wherein the size of the matrix is determined such that all data of the aligned biometric data templates is within the matrix.

10. The method of claim 1, wherein the size of the matrix is predetermined.

11. A biometric matching apparatus comprising:
   a receiver for receiving biometric data of a biometric reading;
   a memory access circuit arranged to access a memory capable of holding a set of biometric data templates; and
   a processing device connected to the receiver and the memory access circuit, and arranged to determine whether the received biometric data match at least one of the templates of the set of biometric data templates according to claim 10.

12. The apparatus of claim 11, being a portable data carrier.

13. The apparatus of claim 11, being a wired or wireless communication device.

14. The method of claim 1, wherein each cell corresponds to a size such that the biometric object is considered covered by 5 to 50 cells by 5 to 50 cells.

15. A method of matching biometrics to determine if a biometric reading and a set of biometric data templates emanates from biometric objects which are idem, the method comprising
- storing a set of biometric data templates according to claim 1;
- reading a biometric object to be checked;
- extracting biometric data from the biometric reading; and
- matching the extracted biometric data with biometric data of one or more of the templates of the set of biometric data templates.

16. The method of claim 15, upon a found match, further comprising updating the set of biometric data templates by assigning the set of biometric data templates and the biometric data from the biometric reading as the plurality of biometric data templates and storing an updated set of biometric data templates by performing the method according to claim 1.

17. A biometric matching apparatus comprising:
- a receiver for receiving biometric data of a biometric reading;
- a memory access circuit arranged to access a memory capable of holding a set of biometric data templates; and
- a processing device connected to the receiver and the memory access circuit, and arranged to store a set or updated set of the set of biometric data templates according to claim 1.

* * * * *